United States Patent [19]

Griffin et al.

[11] 4,151,710

[45] May 1, 1979

[54] LUBRICATION COOLING SYSTEM FOR AIRCRAFT ENGINE ACCESSORY

[75] Inventors: James G. Griffin, West Hartford; Irwin D. Singer, Glastonbury, both of Conn.; Roger L. Summers, Lafayette, Ind.

[73] Assignee: United Technologies Corporation, Hartford, Conn.

[21] Appl. No.: 777,233

[22] Filed: Mar. 11, 1977

[51] Int. Cl.² .............................................. F02C 7/06
[52] U.S. Cl. ................................ 60/39.08; 60/226 R; 184/6.11
[58] Field of Search ................. 60/39.07, 39.08, 39.33, 60/226 R; 184/6.11

[56] References Cited

U.S. PATENT DOCUMENTS 2,865,580  12/1958  Marshall .............................. 60/39.08
3,797,561  3/1974  Clark et al. .......................... 60/39.08

OTHER PUBLICATIONS

Garrett Corp., TFE 731 Turbofan Pamphlet (1974).
Pratt & Whitney, "The Aircraft Gas Turbine Engine and Its Operation" (1974) p. 126.

Primary Examiner—Louis J. Casaregola
Attorney, Agent, or Firm—Norman Friedland

[57] ABSTRACT

This invention serves to cool the lubricant used by a mechanical constant speed drive (CSD) driving an aircraft alternator which aircraft is powered by a turbofan engine. The system cooling capacity is supplemented by an existing engine fuel/oil heat exchanger thereby effectuating a reduction in size of the CSD fan air/oil heat exchanger and minimizing an aircraft engine performance penalty.

4 Claims, 3 Drawing Figures

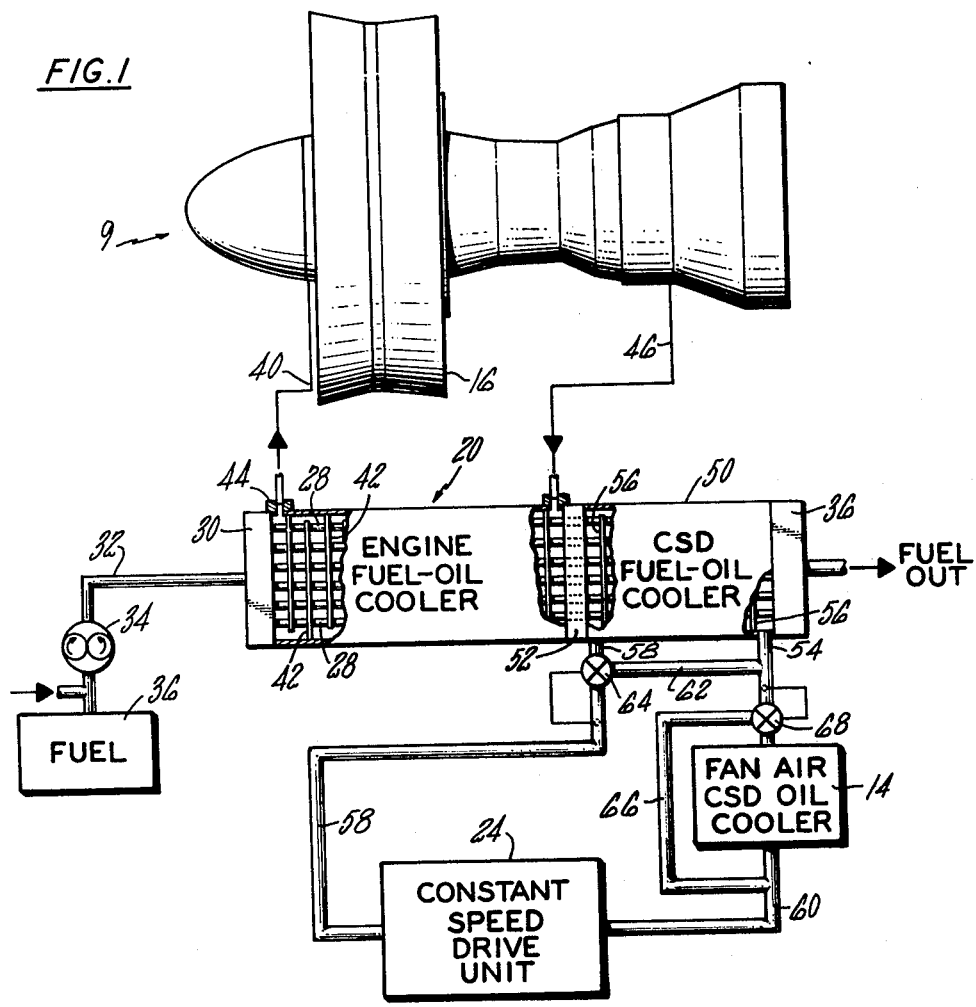
FIG.1
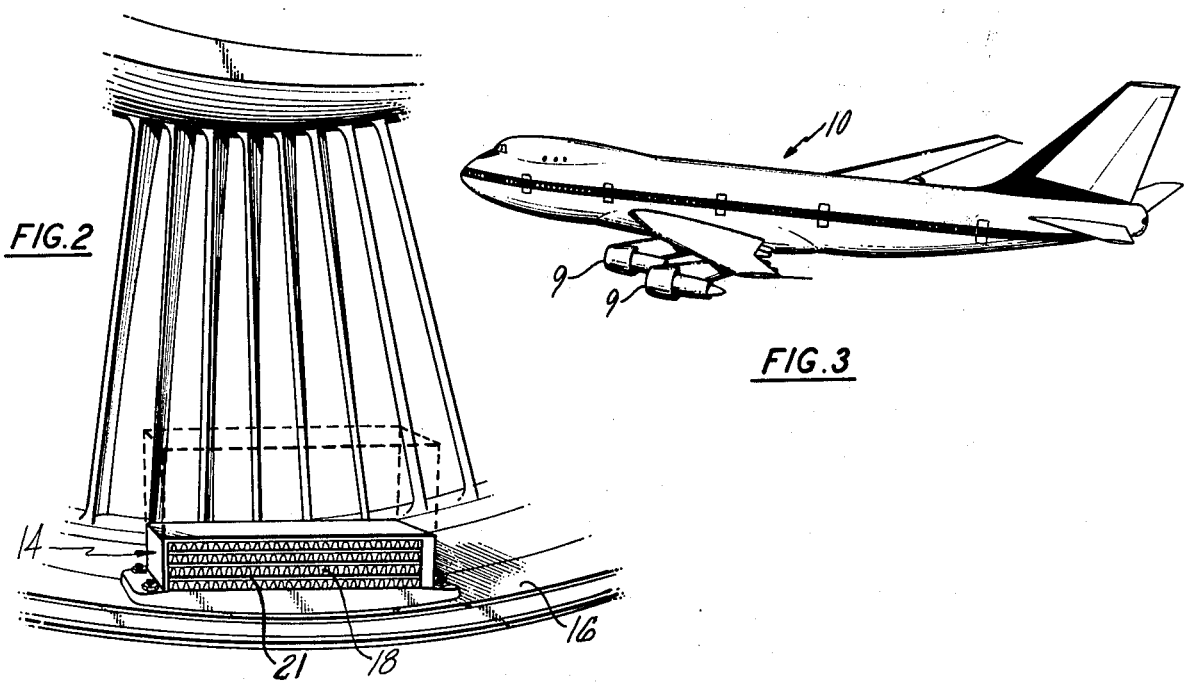
FIG.2
FIG.3

LUBRICATION COOLING SYSTEM FOR AIRCRAFT ENGINE ACCESSORY

BACKGROUND OF THE INVENTION

This invention relates to turbofan engines utilizing a mechanical constant speed drive and particularly to the cooling system for the lubricant used in the constant speed drive.

As is well known the constant speed drive, which is a gear and clutch arrangement, serves to generate electricity for the aircraft. In a turbofan driven aircraft, the fan air/lubricant cooler is located in the fan duct (as shown in FIG. 2) and extends into the fan airstream. Associated with this type of plate/fin heat exchanger is a pressure loss which is reflected in terms of aircraft performance penalty. In a given installation utilizing the JT-9D engine (manufactured by the P&WA division of UTC, the assignee) this pressure loss amounted to approximately a loss of 0.8% of TSFC (thrust specific fuel consumption).

It has also been well known that a typical constant speed drive lubricant cooling system would use a single heat exchanger which is of the plate/fin type in the fan airstream as described above.

We have found that we can improve TSFC by reducing the size of the fan air/oil heat exchanger because fan stream pressure losses have been reduced by utilizing the engine/oil heat exchanger that is already in existence. When the JT-9D was upgraded to increase its thrust, a doubling in size of the existing fan air/oil cooler would have been necessary. By virtue of this invention, the size of the cooler on the upgraded engine was actually reduced in size by a factor of 6, or approximately ⅓ of the predecessor engine cooler. In terms of TSFC, an improvement of 1% was realized.

Moreover, there are advantages gained from utilizing the engine fuel/oil cooler that wasn't available heretofore. Namely, because of fuel pump inefficiency and engine oil heat transfer, a large temperature rise of the fuel is occasioned during aircraft descent. This is primarily due to the pilot cutting back on the power lever reducing thrust and engine power, which causes the fuel to recirculate resulting in a higher fuel temperature. Connecting the CSD lubricant to the engine fuel/oil heat exchanger now serves to reduce the temperature of the fuel prior to it being admitted to the engine's combustor. This lower fuel temperature, in effect, reduces the adverse effect of the higher temperature fuel during descent on the combustor, resulting in a longer life of the combustor.

By locating the CSD fuel/oil portion of the engine fuel/oil cooler in a downstream position, relative to fuel flow, the heat transfer from the CSD lubricant does not interfere with the engine lubrication system.

SUMMARY OF THE INVENTION

An object of this invention is to provide for a mechanical constant speed drive for a turbofan engine powered aircraft an improved lubricant cooling system.

A still further object of this invention is to provide for a CSD as described a lubrication system that utilizes the engine fuel as a supplementary heat sink. A feature of this invention is to utilize the existing tube/plate engine fuel/oil heat exchanger thereby reduding the size of the plate/fin CSD heat exchanger improving engine performance and TSFC. The heat transfer on the fuel serves to chill the fuel prior to admittance to the combustor during a descent mode of the aircraft, improving the life of the combustor.

Other features and advantages will be apparent from the specification and claims and from the accompanying drawings which illustrate an embodiment of the invention.

BRIEF DESCRIPTION OF THE DRAWING

FIG. 1 is a partly schematic and partly block diagram showing the CSD lubricant cooling system.

FIG. 2 is a partial view in perspective showing the fan air/oil heat exchanger mounted in the fan duct.

FIG. 3 is a perspective view of the aircraft utilizing this invention.

DESCRIPTION OF THE PREFERRED EMBODIMENT

As is illustrated in FIGS. 1-3 the invention is contemplated as being utilized on aircraft as the one illustrated by reference numeral 10 powered by a suitable engine generally illustrated by reference numeral 9. In this preferred embodiment the aircraft may be for example the Boeing designated model 747 manufactured by the Boeing Airplane Company and the engine may be the JT9D manufactured by the Pratt & Whitney Aircraft Group division of UTC, the assignee of this application.

It is to be understood that this invention is not limited to the above named engine and aircraft, as one skilled in this art will appreciate that this invention has utility in other engine/aircraft installations. However, the invention is particularly efficacious in an application where the lubricant for the constant speed drive is cooled by a heat exchanger that is mounted in the fan airstream of the engine. As noted in FIG. 2, the oil cooler 14 for the constant speed drive is mounted on the fan duct 16. In this instance the oil cooler 14 is a plate/fin cross flow design where the air passages 18 alternate with oil passages 21 for indirect heat transfer for chilling the lubricant.

As is apparent from FIG. 2, heat exchanger 14 extends in the fan airstream and represents a pressure loss which is directly related to the frontage area exposed in the stream. Obviously, by reducing its size, which has been done by virtue of this invention and which is illustrated by the dashed outline of the unit illustrating the heretofore size, the pressure loss can be correspondingly reduced. In this particular installation the reduction of size of the heat exchanger 14 was sufficient to realize a 1% increase in TSFC.

Referring now to FIG. 1, constant speed drive 24 which is typically mounted to engine 9 generates approximately 1000 BTU/minute which heat is dissipated by the lubricant continuously flowing therethrough. Heretofore the lubricant was cooled by a suitable heat exchanger similar to heat exchanger 14 sized to cool the CSD for its most severe operating conditions. The heat exchanger 14 is represented in FIG. 1 with a like designation.

It is customary, as is shown in FIG. 1, to cool the engine lubrication system with a plate/tube heat exchanger as is illustrated by reference numeral 20. On the installation noted above, heat exchanger 20 existed and it consisted of a plurality of tubes 28 receiving engine fuel fed into header 30 via line 32, pump 34 and fuel tank 36. The fuel flows straight through and is collected in outlet header 36 where it then is fed to the engine's combustor (not shown). The heated engine lubricant is conducted from engine 9 via line 46, flows over the pipes 28 and is directed through a circuitous path formed by baffle plates 42 to discharge through outlet 44 and returned to the engine via line 40.

In accordance with this invention the heretofore existing engine fuel-oil cooler 20 was modified to accept the lubricant from the CSD. Hence, portion 50 was added by extending tubes 28 through the wall 52 and the oil from the CSD 24 is directed into portion 50 via line 54 and is circuitously routed via baffles 56 over tubes 28 to outlet pipe 58.

It is apparent from the foregoing that the heated lubricant when the CSD is operating under its most severe condition is directed through the fan air/oil cooler 14 via line 60 and through the CSD fuel/oil cooler 50 via line 54 and returned chilled to CSD 24 via line 58.

To assure that the temperature of lubricant for CSD doesn't fall below a predetermined value, say 140° F. a bypass 62 and temperature responsive valve 64 are included. Hence if the temperature in line 58 downstream of valve 64 falls below 140° F. setting, the fuel/oil cooler 50 will be bypassed. During engine startup with cold oil the bypass line 66 will flow lubricant around heat exchanger 14 via a pressure relief valve 68. Similarly, valve 64 has a cold oil pressure relief function in addition to the above-mentioned temperature control function.

It is apparent from the drawing that because portion 50 of heat exchanger 26 is downstream relative to the flow of fuel of the engine lubricant, the addition to heat exchanger 26 has no adverse effect on the engine lubricating system.

Furthermore, during descent of the aircraft in a landing mode, the excess fuel being pumped by pump 34 and not being combusted, due to a reduced power setting, is recirculated and by virtue thereof is reheated. The fan air/oil cooler 14 is able to reduce the lubricant from the CSD to a temperature that is lower than this now heated fuel. This results in a heat transfer from the fuel to the CSD lubricant, reducing the temperature of the fuel being admitted to the engine's combustor. The reduced temperature fuel has the effect of prolonging the life of the combustor.

It should be understood that the invention is not limited to the particular embodiments shown and described herein, but that various changes and modifications may be made without departing from the spirit or scope of this novel concept as defined by the following claims.

We claim:

1. Lubrication system for a constant speed drive mechanically driven by a turbofan engine having a fuel to lubricant heat exchanger for cooling the engine lubricant with the engine's fuel prior to combustion by indirect heat exchange relation, a cooling system for the lubricant of the constant speed drive including a plate/fin heat exchanger for indirect heat exchange of the lubricant and fan air mounted on the fan duct and extending in the fan air stream, a cooling loop for the lubricant of the constant speed drive including an extension of said fuel to lubricant heat exchanger for indirect heat exchange of said constant speed drive lubricant and engine fuel, thereby minimizing the size of the fan mounted plate/fin heat exchanger and improving engine performance, said cooling loop includes conduit means for directing said lubricant to said fuel to lubricant heat exchanger, and means to separate said lubricant for the constant speed drive from the engine lubricant such that the lubricant for the constant speed drive is downstream of the engine lubricant relative to the flow of fuel.

2. A lubrication system as in claim 1 including a bypass means for bypassing said plate/fin heat exchanger when said lubricant goes below a predetermined temperature value.

3. A lubrication system as in claim 2 including another bypass means for bypassing said fuel to lubricant heat exchanger whenever said temperature reaches a predetermined condition.

4. A lubrication system as in claim 1 wherein said fuel to lubricant heat exchanger includes a plurality of axially extending tubes for conducting the flow of fuel prior to being delivered to the combustor of said engine.

* * * * *